(12) United States Patent
Sheehan (10) Patent No.: US 12,510,117 B2
(45) Date of Patent: Dec. 30, 2025

(54) WEAR PAD, TELESCOPIC BOOM ASSEMBLY AND WORK MACHINE

(71) Applicant: Caterpillar Inc., Peoria, IL (US)

(72) Inventor: Paul Anthony Sheehan, Leicestershire (GB)

(73) Assignee: Caterpillar Inc., Peoria, IL (US)

( * ) Notice: Subject to any disclaimer, the term of this patent is extended or adjusted under 35 U.S.C. 154(b) by 56 days.

(21) Appl. No.: 18/292,010

(22) PCT Filed: Jul. 26, 2022

(86) PCT No.: PCT/US2022/038302
§ 371 (c)(1),
(2) Date: Jan. 25, 2024

(87) PCT Pub. No.: WO2023/018541
PCT Pub. Date: Feb. 16, 2023

(65) Prior Publication Data
US 2024/0337289 A1    Oct. 10, 2024

(30) Foreign Application Priority Data
Aug. 13, 2021   (GB) ..................................... 2111679

(51) Int. Cl.
*F16C 29/02*    (2006.01)
*B66F 9/065*    (2006.01)
(Continued)

(52) U.S. Cl.
CPC ............ *F16C 29/02* (2013.01); *B66F 9/0655* (2013.01); *B66F 9/075* (2013.01); *F16C 33/24* (2013.01);
(Continued)

(58) Field of Classification Search
CPC ...... F16C 29/02; F16C 33/24; F16C 2202/52; F16C 2202/54; F16C 2208/32;
(Continued)

(56) References Cited

U.S. PATENT DOCUMENTS 3,221,482 A * 12/1965 Cowling ............... A01D 34/866
56/15.8
3,620,579 A * 11/1971 Brown ................... B66C 23/705
212/231
(Continued)

FOREIGN PATENT DOCUMENTS

CN    202297059 U    7/2012
CN    111960301 A    11/2020
(Continued)

OTHER PUBLICATIONS

International Search Report related to Application No. PCT/US2022/038302; reported on Oct. 25, 2022.
(Continued)

*Primary Examiner* — Henry Y Liu (57) ABSTRACT

The present invention pertains to a wear pad for a telescopic boom of a work machine, comprising a base part configured to be fixedly mounted to the telescopic boom, and a top layer part configured to provide a wear-resistant, low friction sliding surface. The top layer part is configured to be releasably mounted to the base part. The invention further pertains to a telescopic boom assembly for a work machine, comprising a first boom segment having at least one first wear pad assembly mounted to a free end of the first boom segment, and a second boom segment having at least one second wear pad assembly mounted to a sliding end of the second boom segment, wherein at least one of the wear pad assemblies comprise a wear pad having a base part and a top layer part configured to provide a wear-resistant, low friction sliding surface. The top layer part is configured to be
(Continued)

releasably mounted to the base part. Further, the present invention pertains to a work machine comprising such telescopic boom assembly.

16 Claims, 5 Drawing Sheets

(51) Int. Cl.
| | |
|---|---|
| *B66F 9/075* | (2006.01) |
| *E02F 3/28* | (2006.01) |
| *E02F 3/38* | (2006.01) |
| *F16C 33/24* | (2006.01) |

(52) U.S. Cl.
CPC ............... *E02F 3/286* (2013.01); *E02F 3/38* (2013.01); *F16C 2202/52* (2013.01); *F16C 2202/54* (2013.01); *F16C 2208/32* (2013.01); *F16C 2208/60* (2013.01); *F16C 2226/60* (2013.01)

(58) Field of Classification Search
CPC .............. F16C 2208/60; F16C 2226/60; F16C 2226/62; F16C 2300/28; F16C 2350/00; B66F 9/0655; B66F 9/075; B66F 11/046; B66C 23/707; E02F 3/286; E02F 3/38; E02F 9/14
USPC .......................................................... 384/13
See application file for complete search history.

(56) References Cited

U.S. PATENT DOCUMENTS

| | | | | |
|---|---|---|---|---|
| 3,830,376 A * | 8/1974 | Fritsch | ................... | B66C 23/702 212/350 |
| 4,004,695 A * | 1/1977 | Hockensmith | ........ | B66C 23/701 52/118 |
| 4,134,236 A * | 1/1979 | Ott | ........................ | B66C 23/707 52/118 |
| 4,264,265 A * | 4/1981 | Stoychoff | ............... | E02F 3/306 414/718 |
| 4,759,452 A * | 7/1988 | Faint | ........................ | F16C 29/02 52/118 |
| 5,158,189 A * | 10/1992 | Watson | ................. | B66C 23/707 212/350 |
| 6,726,437 B2 * | 4/2004 | Albright | ................. | E02F 3/306 414/718 |
| 6,908,271 B2 * | 6/2005 | Breslin | ................. | F16B 39/023 411/57.1 |
| 8,083,459 B2 * | 12/2011 | Tygard | .................... | B66C 1/427 52/118 |
| 8,375,649 B2 * | 2/2013 | Grotz | ........................ | B66F 7/28 52/843 |
| 10,066,363 B1 * | 9/2018 | McGee, Jr. | ............. | F16C 33/20 |
| 10,662,035 B2 * | 5/2020 | Cunningham | .......... | F16C 35/02 |
| 11,041,526 B1 * | 6/2021 | Calago | .................... | F16C 29/02 |
| 12,122,647 B2 * | 10/2024 | Holden | .................... | E02F 3/38 |
| 2005/0045575 A1 * | 3/2005 | Wimmer | ................. | F16C 29/02 212/350 |
| 2006/0042131 A1 * | 3/2006 | Pinther, II | ................. | E02F 3/38 37/466 |
| 2015/0008207 A1 * | 1/2015 | Habe | ...................... | B66C 23/708 212/350 |
| 2015/0233427 A1 * | 8/2015 | Chang | ................... | F16C 29/086 384/13 |
| 2016/0130119 A1 * | 5/2016 | Fortunato | ............... | F16C 29/02 384/29 |
| 2019/0152748 A1 * | 5/2019 | LaTendresse | ......... | B66C 23/707 |

FOREIGN PATENT DOCUMENTS

| | | |
|---|---|---|
| DE | 20015831 U1 | 12/2000 |
| EP | 1529749 A1 | 5/2005 |
| EP | 1555237 A2 | 7/2005 |
| EP | 2189413 A1 | 5/2010 |
| EP | 1951985 B1 | 5/2014 |
| JP | H11130378 A | 5/1999 |
| JP | 2010189163 A | 9/2010 |

OTHER PUBLICATIONS

Great Britain Search Report related to Application No. 2111679.3; reported on Feb. 3, 2022.
Michael Russo, "Product Spotlight: Bronze Slide Bearing Plates for Pipeline Support Systems—National Bronze Manufacturing", Jun. 26, 2018, https://www.nationalbronze.com/News/product-spotlight-bronze-slide-bearing-plates-for-pipeline-support-systems/, XP055957215.

* cited by examiner

WEAR PAD, TELESCOPIC BOOM ASSEMBLY AND WORK MACHINE

CROSS-REFERENCE TO RELATED APPLICATION

This Application is a 35 USC § 371 US National Stage filing of International Application No. PCT/US2022/038302 filed on Jul. 26, 2022 which claims priority under the Paris Convention to Great Britain Patent Application No. 2111679.3 filed on Aug. 13, 2021.

TECHNICAL FIELD

The present invention pertains to a wear pad for a telescopic boom of a work machine comprising a base part configured to be fixedly mounted on the telescopic boom and a top layer part configured to provide a wear resistant, low friction sliding surface. The present invention also pertains to a telescopic boom assembly for a work machine comprising a first boom segment having at least one first wear pad assembly mounted to a free end of the first boom segment, and a second boom segment having at least one second wear pad assembly mounted to a sliding end of the second boom segment. The invention also pertains to a work machine comprising such a telescopic boom assembly.

Technological Background

Wear pad elements are used within a wide variety of telescopic boom assemblies of work machines. As an example, work machines such as telehandlers usually utilize telescopic booms to pick and place objects at heights on construction sites. However, also backhoe loaders, small wheel loader or other work machines may comprise telescopic booms for a variety of tasks.

The main purpose of a wear pad for a telescopic boom of a work machine is allowing relative displacements of telescopic boom segments at minimum friction. Thereby, extension and retraction of the telescopic boom assembly may be achieved with the lowest hydraulic power.

Providing the main surfaces via which two adjacent boom segments engage with each other, wear pads also play a key role in positioning, supporting and guiding boom segments over their entire range of motion. Inherently, wear on a wear pad may influence spatial boom segment orientation.

As telescopic boom assemblies usually require a large quantity of wear pads, inevitable wear pad replacements are costly. Therefore, it is a general desire to identify a wear pad design achieving an optimum between durability and cost-effectiveness.

From the state of the art, wear pads are known consisting of a material having wear-resistant, low friction material properties, which are configured to be mounted to a telescopic boom segment. However, wear pads made of high-quality materials are often costly. Further, wear pads made of such materials are sometimes difficult to mount to a telescopic boom segment and may have low structural stability which may lead to a spatial boom segment offset. The spatial boom offset thus increases by load and wear. Further, due to being mounted on the telescopic boom segment, replacing such wear pads requires manual work on the boom segment itself.

The wear pad, the telescopic boom and the work machine of the present disclosure solve one or more problems set forth above.

SUMMARY OF THE INVENTION

Starting from the prior art, it is an objective to provide a simple, cost-effective, wear resistant wear pad for a telescopic boom of a work machine having only limited spatial boom segment offset and an improved maintenance handling.

This objective is solved by means of a wear pad with the features of claim 1, a telescopic boom assembly for a work machine with the features of claim 10 and a work machine with the features of claim 15. Preferred embodiments are set forth in the present specification, the Figures as well as the dependent claims.

Accordingly, a wear pad for a telescopic boom of a work machine is provided. The wear pad comprises a base part configured to be fixedly mounted to the telescopic boom, and a top layer part configured to provide a wear-resistant, low friction sliding surface. The top layer part is configured to be releasably mounted to the base part.

Furthermore, a telescopic boom assembly for a work machine is provided, comprising a first boom segment having at least one first wear pad assembly mounted to a free end of the first boom segment, and a second boom segment having at least one second wear pad assembly mounted to a sliding end of the second boom segment. At least one of the wear pad assemblies comprises a wear pad having a base part and a top layer part configured to provide a wear resistant, low friction sliding surface. The top layer part is configured to be releasably mounted to the base part.

In addition, a work machine is provided comprising a telescopic boom. The work machine may be a telehandler or a small wheel loader.

BRIEF DESCRIPTION OF THE DRAWINGS

The present disclosure will be more readily appreciated by reference to the following detailed description when being considered in connection with the accompanying drawings in which.

DETAILED DESCRIPTION OF PREFERRED EMBODIMENTS

In the following, the invention will be explained in more detail with reference to the accompanying Figures. In the Figures, like elements are denoted by identical reference numerals and repeated description thereof may be omitted in order to avoid redundancies.

The present disclosure is generally directed towards wear pads for telescopic booms of work machines providing simple, cost-effective, wear resistant wear pads having only limited spatial boom segment offset and an improved maintenance handling. To this end, the teaching of the present disclosure suggests a structural separation of the functions "supporting a boom segment" and "providing a wear-resistant, low friction sliding surface". This may be achieved by providing a rigid base structure and a comparably thin top layer mounted to the base structure. To this end, the present disclosure may be understood such that the wear pad is specifically designed such that it only provides the minimum necessary thickness of a material having wear-resistant, low friction properties while the rest of the wear pad consists of a rigid, solid support structure which may easily be mounted to a boom segment. To compensate for the reduced wear margin, the top layer may comprise a material having a particularly high wear-resistance and a low friction coefficient.

Thereto, the present invention and its underlying principles are disclosed exemplary for a wear pad for a telescopic boom of a work machine.

In all FIGS. 1-7, a Cartesian coordinate system is provided for reference purposes. The Cartesian coordinates are depicted such that the Figures may be put in relation with each other by the coordinate system.

Figure 1:
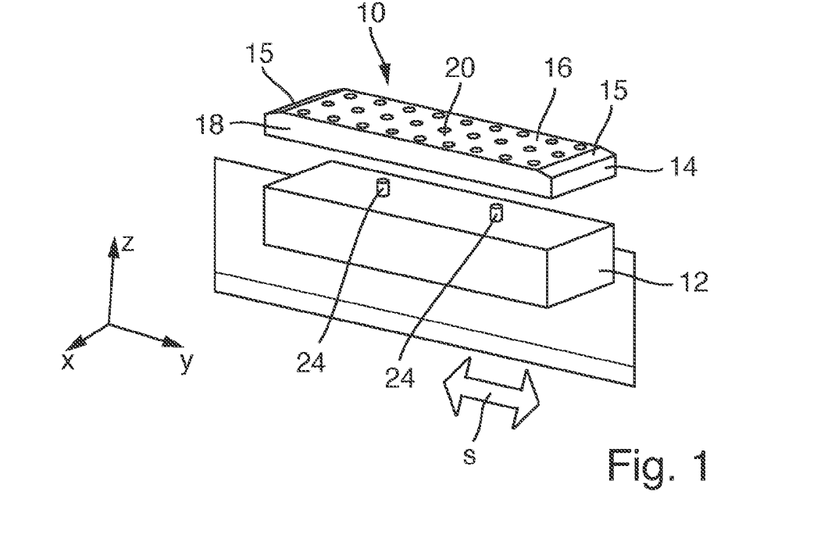
FIG. 1 schematically shows a wear pad for a telescopic boom for a work machine according to an embodiment in a perspective exploded view.

FIG. 1 schematically shows a wear pad 10 for a telescopic boom for a work machine according to an embodiment in a perspective exploded view. The telescopic boom, which is not a part of the wear pad 10, is indicated by the bottom plate in the background. FIG. 1 shows the wear pad 10 in a disassembled view, comprising a base part 12 which is configured to be fixedly mounted to a telescopic boom, and a top layer part 14 configured to provide a wear-resistant, low friction sliding surface 16. The top layer part 14 is configured to be releasably mounted to the base part 12.

The thickness of the base part 12 may for example be about three times the thickness of the top layer part 14. As shown in FIG. 1, the shape of the base part 12 may be a cuboid. However, in principle, the top layer part 14 may have a variety of shapes including shapes different to the base part 12. Essential to the present disclosure is that the top layer part 14 is configured such that it can be releasably mounted to the base part.

During operation of the wear pad, the top layer part 14 may come into contact, or engage, with a surface sliding along its wear-resistant, low friction sliding surface. At the same time, the base part 12, also called packer, is designed not to come into contact, or engage, with any surface sliding along the wear pad. Instead, the base part 12 is designed to support the top layer part 14 at an elevated distance. Thereby, the wear pad provides the functions "supporting a boom segment" via the base part 12 and "providing a wear-resistant, low friction sliding surface" via the top layer part 14.

The sliding surface 16 of a wear pad 10 may be equal to a surface area confined by an outer perimeter of the top layer part 14. According to the embodiment shown in FIG. 1, the outer perimeter of the top layer part 14 may be the outer boundary, or outer circumference, of the top layer part 14 in a plane substantially parallel to the x-y-plane of the shown coordinate system. Accordingly, a surface area confined by an outer perimeter of the top layer part can be understood as a surface area covering the entire area in between the outer perimeter. In other words, the surface area confined by an outer perimeter may be understood as a theoretical maximum of an available surface area for a given outer perimeter, as such a surface area is "uninterrupted". Providing a wear pad 10 having a sliding surface 16 equal to a surface area confined by an outer perimeter of the top layer part 14 has the advantage that the sliding surface 16 can be maximized. Thereby, a substantially full-surface contacting sliding surface 16 may be achieved.

In the context of the following description, the term "equal" may be understood as "substantially equal" to the extent that, as an example, a sliding surface 16 having gaps for the purpose of or due to sliding may be considered a sliding surface 16 equal to a surface area confined by an outer perimeter of the top layer part 14. Likewise, a sliding surface 16 having slanted edges or parts of the sliding surface 16 which are temporarily not part of the actual sliding surface 16 may also be considered a sliding surface 16 equal to a surface area confined by an outer perimeter of the top layer part. However, a sliding surface having for example an assembly opening reaching through, thereby "interrupting", said sliding surface may be not be considered a sliding surface 16 equal to a surface area confined by an outer perimeter of the top layer part.

The top layer part 14 may be configured such that edges 15 extending perpendicular to a sliding direction S are tapered. According to the embodiment shown in FIG. 1, the sliding direction S is parallel to the y-axis of the shown coordinate system. Thereby, the initial friction and wear during operation of the wear pad 10 may be reduced.

The top layer part 14 of the wear pad 10 may comprise a nylon polymer, polytetrafluoroethylene, graphite, molybdenum disulfide and/or a metal. Further, the top layer part 14 may comprise a top layer plate 18 and a multitude of plugs 20, extending at least partially into the top layer plate 18. Thereby, a composite component of different materials may be attained. Additionally or alternatively, the top layer part 14 may comprise a combination of a nylon polymer embedded with a lubricant. Thereby, the compressive strength of nylon may be combined with low friction efficient of the lubricant.

In the embodiment shown in FIG. 1, the top layer part 14 may consist of the top layer plate 18. The multitude of plugs 20 may reach inside of the top layer plate 18 and/or may protrude slightly therefrom. The multitude of plugs 20 may be provided in tapered holes.

The top layer plate 18 may comprise bronze and the multitude of plugs may comprise graphite. Thereby, the top layer part 14 may be configured to provide a wear-resistant, low friction sliding surface 16.

The base part 12 may comprise a ferrous metal, in particular a steel or a steel alloy. Thereby, a low-cost, rigid support for the top layer part 14 may be provided, having a high compressive strength.

The wear pad 10 may further comprise at least one top layer fastening means 24, preferably wherein the top layer fastening means 24 comprises a dowel pin. According to the embodiment shown in FIG. 1, the top layer fastening means 24 may comprise two dowel pins. The two dowel pins may partly extend into the base part 12 and partly into the top layer part 14 and may for example be provided along a longitudinal middle axis of the wear-resistant, low friction slide surface 16.

The top layer part 14 may have a thickness of 10 mm and may further be configured such that it is to be replaced after a wear greater or equal than 3-5 mm, wherein the dowel pins 24 may each have a diameter of 2 mm and a length of 8 mm. Thereby, a gap of 6 mm between the sliding surface 16 and the dowel pins 24 may be provided as erosion thickness.

Figure 2:
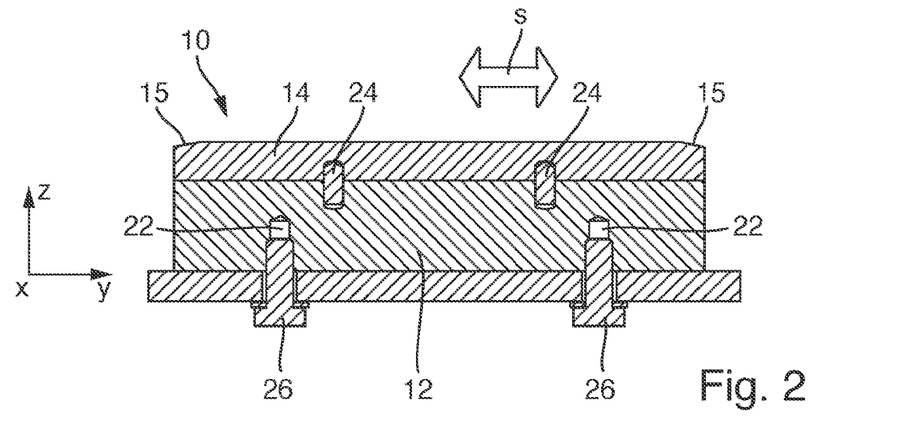
FIG. 2 schematically shows the wear pad for a telescopic boom of FIG. 1 in an assembled state in a cross-sectional view along a y-z plane.

FIG. 2 schematically shows the wear pad 10 for a telescopic boom of FIG. 1 in an assembled state in a cross-sectional view along a y-z plane. In this view, the multitude of plugs 20 of the top layer part 14 is not shown. According to the illustration shown in FIG. 2, the base part 12 may comprise at least one threaded recess 22 and at least one fastening screw 26 configured to engage the at least one threaded recess 22 to fasten the base part 12 to a telescopic boom. More precisely, the base part 12 may comprise two threaded recesses 22 and two fastening screws 26 configured to engage the at least one threaded recess 22 to fasten the base part 12 to a telescopic boom. The threaded recess may be an M10 thread.

In FIG. 2, it is also shown how the top layer part 14 may be configured to be releasably mounted to the base part 12. To this end, the wear pad 10 may further comprise top layer fastening means 24 comprising two dowel pins 24. The two dowel pins may partly extend into the base part 12 and partly into the top layer part 14 and may for example be provided along a longitudinal middle axis of the wear-resistant, low friction slide surface 16. According to an alternative embodiment, the top layer fastening means may for example comprise a protrusion of the top layer part 14, protruding into a recess provided in the base part 12.

Figure 3:
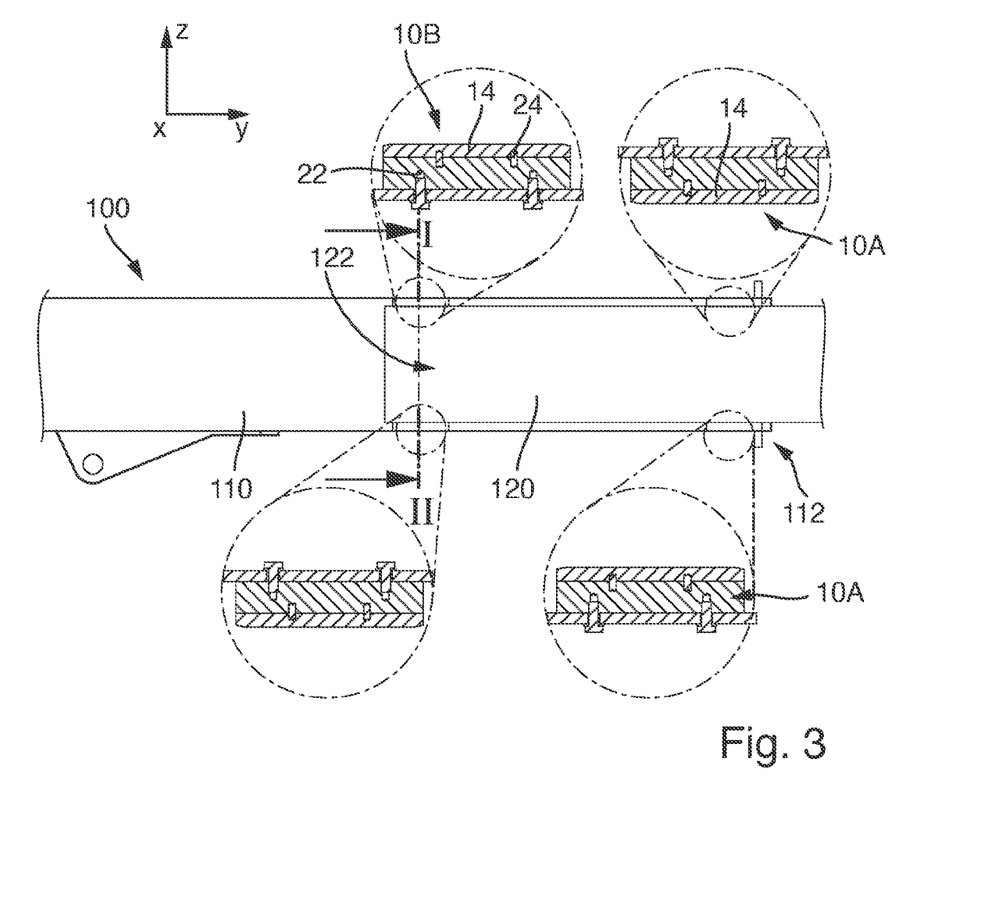
FIG. 3 schematically shows a telescopic boom assembly according to an embodiment in a cross-sectional view along a y-z plane.

FIG. 3 schematically shows a telescopic boom assembly 100 according to an embodiment in a cross-sectional view along a y-z plane.

The telescopic boom assembly 100 shown in FIG. 3 comprises a first boom segment 110 having at least one first wear pad assembly 10A mounted to a free end 112 of the first boom segment 110. Further, telescopic boom assembly 100 comprises a second boom segment 120 having at least one second wear pad assembly 10B mounted to a sliding end 122 of the second boom segment 120. The second boom segment 120 is configured to be slidable along the at least one first wear pad assembly 10A of the first boom segment 110. As shown in FIG. 3, at least one of the wear pad assemblies 10A, 10B comprise a wear pad 10 having a base part 12 and a top layer part 14 configured to provide a wear-resistant, low friction sliding surface 16. The top layer part 14 is configured to be releasably mounted to the base part.

FIG. 3 also illustrates four magnifications, detailing the first wear pad assembly 10A and the second wear pad assembly 10B. Accordingly, the first wear pad assembly 10A may comprise two wear pads 10 according to the embodiment shown in FIGS. 1 and 2. Further, the second wear pad assembly 10B may also comprise two wear pads 10 according to the embodiment shown in FIGS. 1 and 2. According to the present disclosure, the term wear pad assembly may comprise a multitude of wear pads at a given cross-section in an x-y plane of a telescopic boom segment 100.

Seen from the perspective of the telescopic boom 100, the telescopic boom assembly 100 may comprise the first boom segment 110 as a static part and the second boom segment 120 as a slidable part. The telescopic boom assembly 100 may be configured such that the second boom segment 120 may extend to the positive y-direction according to the shown coordinate system. The second boom segment 120 may be slidable until the second wear pad assembly 10B abuts the first wear pad assembly 10A.

According to the embodiment shown in FIG. 3, the at least one first wear pad assembly 10A may be mounted on the inside of the first boom segment 110. The at least one second wear pad assembly 10B may be mounted to the outside of the second boom segment 120, such that the second boom segment 120 may be slidably received on the inside of the first boom segment 110.

According to an alternative embodiment, not shown in the Figures, the at least one first wear pad assembly 10A may be mounted on the outside of the first boom segment 110. The at least one second wear pad assembly 10B may be mounted to the inside of the second boom segment 120, such that the second boom segment 120 may be slidably received on the outside of the first boom segment 110.

The telescopic boom assembly 100 shown in FIG. 3 may comprise boom segments 110, 120 having a rectangular cross-section. The wear pad assemblies 10A, 10B may comprise at least one wear pad 10 on each side of the corresponding boom segment 110, 120. To further illustrate this, it is referred to FIG. 4 in combination with a section plane I-II provided in FIG. 3.

Figure 4:
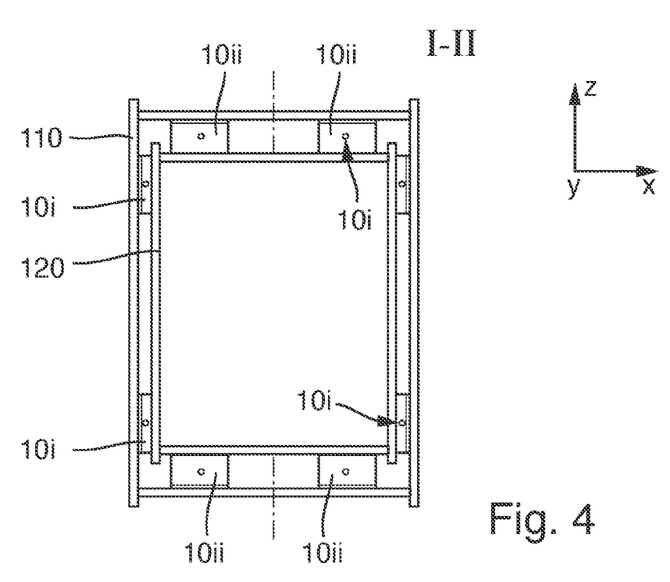
FIG. 4 schematically shows the telescopic boom assembly of FIG. 3 in a cross-sectional view along a x-z plane.

FIG. 4 schematically shows the telescopic boom assembly 100 of FIG. 3 in a cross-sectional view along a x-z plane. More specifically, FIG. 4 schematically shows the telescopic boom assembly 100 seen from along the section plane I-II of FIG. 3. In FIG. 4, the wear pads 10 shown comprise small wear pads 10$i$ and large wear pads 10$ii$. The underlying principles of the present disclosure apply to both small and large wear pads 10$i$, 10$ii$ equally. The wear pads 10$i$, 10$ii$ shown in FIG. 4 belong to the second wear pad assembly 10B of the telescopic boom assembly 100 shown in FIG. 3. The outer rectangle represents the first boom segment 110. The inner rectangle represents the sliding end 122 of the second boom segment 120 of the telescopic boom assembly 100. Correspondingly, the wear pads 10$i$, 10$ii$ shown in cross-section I-II are all mounted to the sliding end 122 of the second boom segment 120.

To this end, the boom segments 110, 120 may have a rectangular cross-section, wherein the wear pad assemblies 10A, 10B may comprise at least one wear pad 10$i$, or 10$ii$ respectively, on each side of the corresponding boom segment 110, 120. More specifically, the wear pad assemblies 10A, 10B may comprise at least two wear pads 10$i$, 10$ii$ on each side of the corresponding boom segment 110, 120, wherein the wear pads 10 provided on the shorter sides may comprise a base part 12 larger than a base part 12 of the wear pads 10 provided on the larger sides of the rectangular cross-section.

More specifically, the sliding end 122 of the second boom segment 120 may comprise four large wear pads 10, two on its upper and lower sides and, in addition thereto, four small wear pads 10, two on each lateral sides of the sliding end 122 of the second boom segment 120. Thereby, the loads acting on the telescopic boom assembly 100 may be distributed adequately. In the embodiment shown in FIGS. 3 and 4, tilting the telescopic boom assembly 100, thereby lifting a tool attached to a working end of the boom assembly 100, will result vertical forces in the z-direction. Further, rotating the telescopic boom assembly 100 may cause lateral forces in the x-direction.

Figure 5:
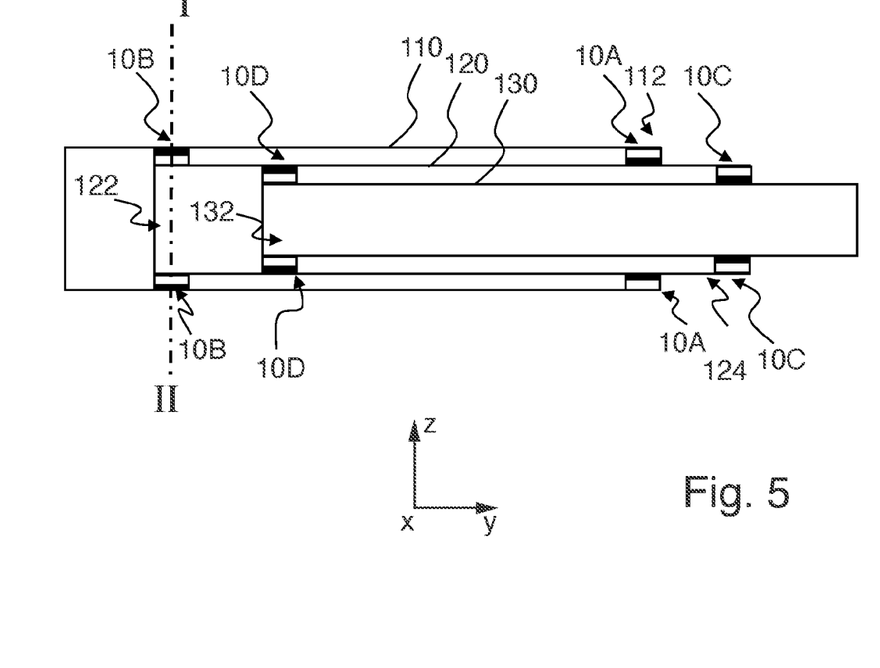
FIG. 5 schematically shows a telescopic boom assembly according to a further embodiment in a cross-sectional view along a y-z plane.

FIG. 5 schematically shows a telescopic boom assembly 100 according to a further embodiment in a cross-sectional view along a y-z plane.

The telescopic boom assembly 100 shown in FIG. 5 may comprise a first boom segment 110 having at least one first wear pad assembly 10A mounted to a free end 112 of the first boom segment 110. Further, telescopic boom assembly 100 may comprise a second boom segment 120 having at least one second wear pad assembly 10B mounted to a sliding end 122 of the second boom segment 120. The second boom segment 120 may be configured to be slidable along the at least one first wear pad assembly 10A of the first boom segment 110. Additionally, the second boom segment 120 may comprise at least one third wear pad assembly 10C mounted to a free end 124 of the second boom segment 120 and a third boom segment 130 having at least one fourth wear pad assembly 10D mounted to a sliding end 132 of the third boom segment 130. The third boom segment 130 may be configured to be slidable along the at least one third wear pad assembly 10C of the second boom segment 110.

The embodiment shown in FIG. 5 may be based on, or fully incorporate, the embodiment shown in FIG. 3, yet with an additional, third boom segment 130. Accordingly, with respect to the wear pad assemblies 10A and 10B, the same principles defined in the context of FIG. 3 also apply for the additional wear pad assemblies 10C and 10D.

As shown in FIG. 5, at least one of the wear pad assemblies 10A, 10B may comprise a wear pad 10 having a base part 12 and a top layer part 14 configured to provide a wear-resistant, low friction sliding surface 16. The top layer part 14 may be configured to be releasably mounted to the base part.

The telescopic boom assembly 100 shown in FIG. 5 may comprise boom segments 110, 120, 130 having a rectangular cross-section. The wear pad assemblies 10A, 10B, 10C, 10D may comprise at least one wear pad 10 on each side of the corresponding boom segment 110, 120, 130. To further illustrate this, it is referred to FIG. 6 in combination with a section plane I-II provided in FIG. 5.

Figure 6:
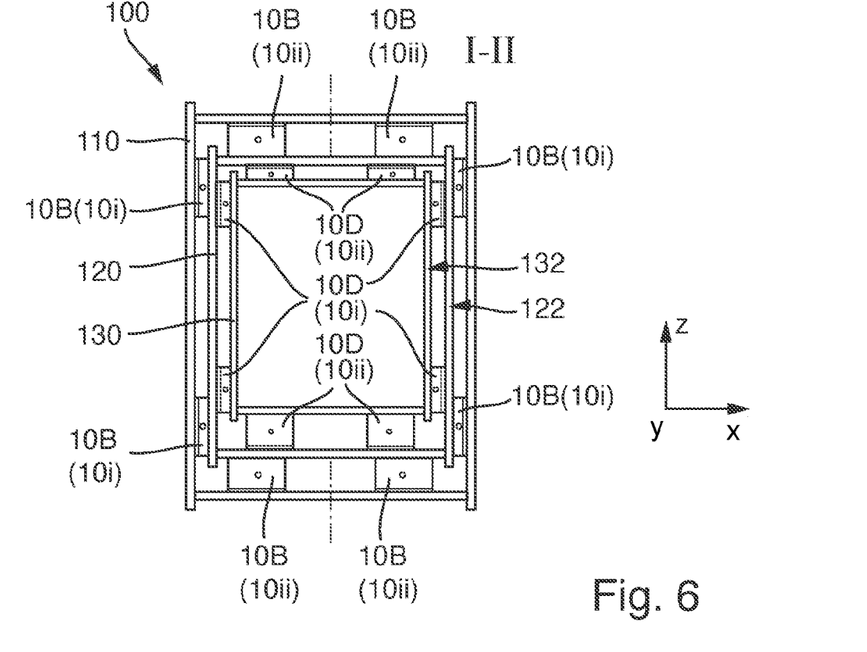
FIG. 6 schematically shows the telescopic boom assembly of FIG. 5 in a cross-sectional view along a x-z plane.

FIG. 6 schematically shows the telescopic boom assembly 100 of FIG. 5 in a cross-sectional view along a x-z plane. More specifically, FIG. 4 schematically shows the telescopic boom assembly 100 seen from along the section plane I-II of FIG. 5, yet in a configuration where the third boom segment 130 is retracted such that its sliding end 132 is also positioned within the section plane I-II.

The wear pads 10i, 10ii shown in FIG. 6 belong to the second wear pad assembly 10B and the fourth wear pad assembly 10D of the telescopic boom assembly 100 shown in FIG. 3. The outer rectangle represents the first boom segment 110. The middle rectangle represents the sliding end 122 of the second boom segment 120 and the inner rectangle represents the sliding end 132 of the third boom segment 130 of the telescopic boom assembly 100. Correspondingly, the wear pads 10 belonging to the second wear pad assembly 10B in cross-section I-II are all mounted to the sliding end 122 of the second boom segment 120. Likewise, the wear pads 10i, 10ii belonging to the fourth wear pad assembly 10D in cross-section I-II are all mounted to the sliding end 132 of the third boom segment 130 of the telescopic boom assembly 100.

To this end, the wear pad assemblies 10A, 10B, 10C, 10D may comprise at least one wear pad 10 on each side of the corresponding boom segment 110, 120, 130. More specifically, the wear pad assemblies 10A, 10B, 10C, 10D may comprise at least two wear pads 10i, 10ii respectively, on each side of the corresponding boom segment 110, 120, 130, wherein the large wear pads 10ii provided on the shorter sides may comprise a base part 12 larger than a base part 12 of the short wear pads 10i provided on the larger sides of a rectangular cross-section.

More specifically, the sliding end 122 of the second boom segment 120 may comprise four large wear pads 10, two large wear pads 10ii on each of its upper and lower sides and, in addition thereto, four small wear pads 10i, two on each lateral sides of the sliding end 122 of the second boom segment 120. Thereby, the loads acting on the telescopic boom assembly 100 may be distributed adequately. Likewise, the sliding end 132 of the third boom segment 130 may comprise four large wear pads 10ii, two on each of its upper and lower sides and, in addition thereto, four small wear pads 10i, two on each of its lateral sides of the sliding end 132 of the third boom segment 130. Thereby, the loads acting on the telescopic boom assembly 100 may be distributed adequately.

Figure 7:
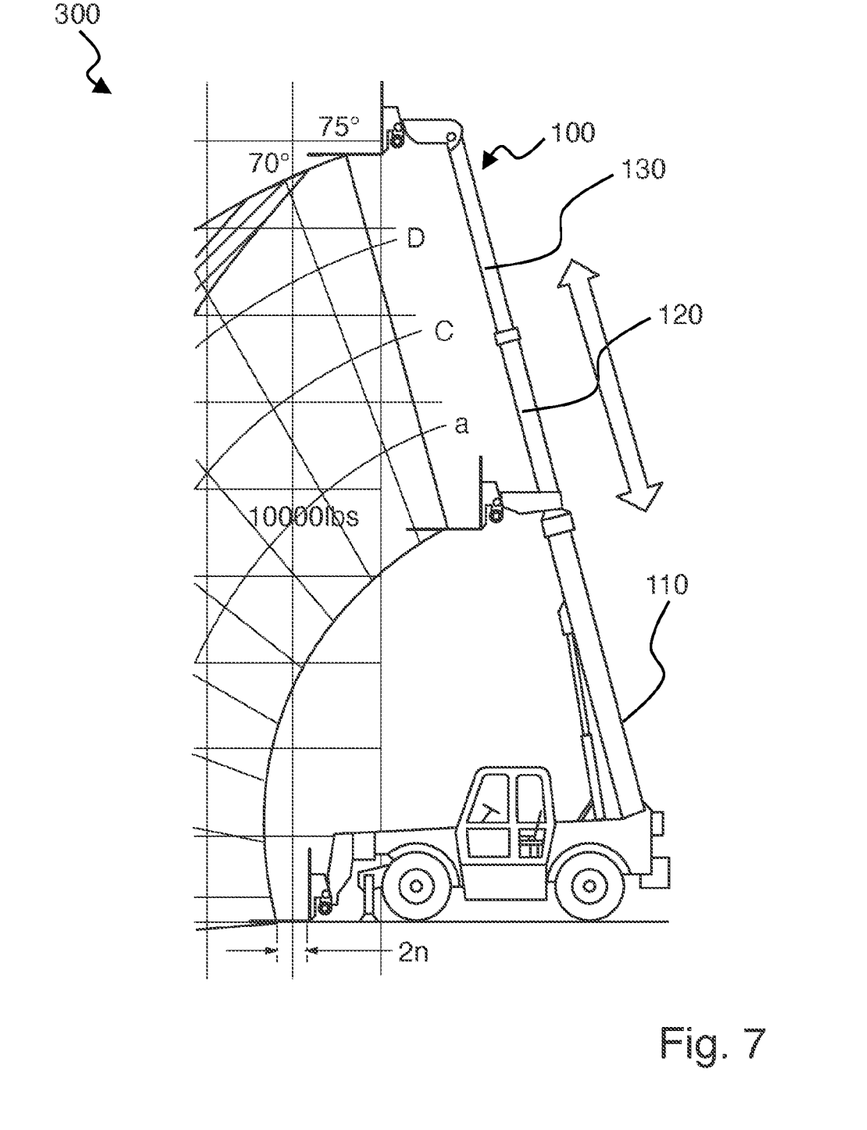
FIG. 7 schematically shows a work machine comprising a telescopic boom according to the embodiment shown in FIGS. 5 and 6.

FIG. 7 schematically shows a work machine 300 comprising a telescopic boom according to the embodiment shown in FIGS. 5 and 6. The telescopic boom assembly 100 shown in FIG. 7 comprises a first boom segment 110, a second boom segment 120 and a third boom segment 130.

It will be obvious for a person skilled in the art that these embodiments and items only depict examples of a plurality of possibilities. Hence, the embodiments shown here should not be understood to form a limitation of these features and configurations. Any possible combination and configuration of the described features can be chosen according to the scope of the invention.

This is in particular the case with respect to the following optional features which may be combined with some or all embodiments, items and all features mentioned before in any technically feasible combination. As an example, a wear pad may have more than one base parts and/or top layer parts. Each telescopic boom assembly may have more than a first, a second and a third boom segment and there may be more or less wear pads provided within a telescopic boom assembly.

A wear pad for a telescopic boom of a work machine may be provided, comprising a base part configured to be fixedly mounted to the telescopic boom and a top layer part configured to provide a wear resistant, low friction sliding surface. The top layer part is configured to be releasably mounted to the base part. Thereby, most of the wear pad may be provided in the shape of a base part wherein only a top layer part is configured to provide a wear resistant, low friction sliding surface. For example, the top layer part may comprise wear resistant, low friction material. Since such material is only needed for the top layer part, high-grade materials may be utilized.

By providing the top layer such that it is configured to be releasably mounted to the base part allows a simplified maintenance of a wear pad, since no manual work at the surrounding structure is required. Instead, the top layer part may simply be taken of the base part and be replaced by a new top layer part.

According to the present disclosure, releasably mounted may refer to a mount which is configured such that under normal operation of a telescopic boom assembly or a work machine, unintentional disengagement of the top layer part from the base part can be excluded. The expression releasably mounted may further refer to a mount which may be released manually or by using tools. Preferably, the expression releasably mounted may refer to a mount that allows releasing the top layer part from the base part without destroying the top layer part and/or the base part.

By comprising a wear pad having a base part and a top layer part configured to provide a wear resistant, low friction sliding surface, wherein the top layer part is configured to be releasably mounted to the base part, a simple, cost-effective, wear resistant wear pad for a telescopic boom of a work machine having only limited spatial boom segment offset and an improved maintenance handling.

By this, the available margin for erosion of the wear pad, also called erosion depth, may be restricted to the available thickness of the top layer part or a part of the thickness of the top layer part. At the same time, the remaining thickness of the wear pad may be configured such that it is optimized to support the top layer part and to be fixedly mounted the base part to the telescopic boom. Thereby, a more rigid, reliable and safe positioning of telescopic boom segments may be provided.

In a further development, the sliding surface may be equal to a surface area confined by an outer perimeter of the top layer part. According to the present disclosure, the outer perimeter of the top layer part may be the outer boundary, or outer circumference, of the top layer part in a plane substantially parallel to the sliding plane. By providing a wear pad having a sliding surface equal to a surface area confined by an outer perimeter of the top layer part, the sliding surface can be maximized. Thereby, a substantially full-surface contacting sliding surface may be provided. In other words, the surface area covered by the wear pad can be maximized, thereby increasing the effectiveness of a wear pad. As an example, the pressure on a wear pad for a given force acting on sliding surface of a wear pad may be reduced.

In a further development, the top layer part may be configured such that edges extending perpendicular to a sliding direction may be tapered. Thereby, the initial friction can be reduced. Further, excessive wearing or tearing of edges extending perpendicular to a sliding direction can thereby be avoided or reduced.

According to the present disclosure, the top layer part may comprise a nylon, polytetrafluoroethylene, graphite, molybdenum disulfide and/or a metal. Thereby, the top layer part may be configured to provide a wear-resistant, low friction sliding surface. Polytetrafluoroethylene (PTFE), graphite, molybdenum disulfide and metal have the advantage of high temperature resistance. Thereby, wear can be minimized even at elevated operation temperatures and/or at high loads acting on the sliding surface. In general, the top layer part may comprise a material having sufficient compressive strength to withstand loads but also offers a good compressive strength and a low friction coefficient in order to allow transverse sliding action of a boom segment sliding along the sliding surface.

In a preferred development, the top layer part may comprise a combination of a nylon polymer embedded with a lubricant. Thereby, the compressive strength of nylon may be combined with low friction efficient of the lubricant.

In a preferred embodiment, the top layer part may comprise a top layer plate and a multitude of plugs, extending at least partially into the top layer plate. Thereby, a composite component of different materials may be attained. As an example, the top layer part may consist of the top layer plate further multitude of plugs may reach inside of the top layer plate and/or may protrude slightly therefrom. By this, advantages of different physical material properties may be combined effectively.

According to a preferred embodiment, the top layer plate may comprise bronze, wherein the multitude of plugs a comprise graphite. By comprising a composite of bronze and graphite, graphite particles may serve as smearing substance for the bronze top layer plate, thereby increasing the overall wear assistance and decreasing the friction coefficient of the sliding surface of the wear pad.

In a further development, the base part may comprise a ferrous metal, in particular a steel or a steel alloy. By providing the base part such that it comprises a ferrous metal, a cost-effective, rigid support for the top layer part may be provided. Thereby, the base part may comprise a material of high compressive strength. Further, the base part may be mounted conveniently to a surrounding structure. Preferably, the base part may be configured to be fixedly mounted to the telescopic boom by a welded joint. To this end, the base part may have a material composition which is weldable to a telescopic boom segment.

In a preferred embodiment, the wear pad may comprise a base part comprising at least one threaded recess in at least one fastening screw configured to engage the at least one threaded recess to fasten the base part to a telescopic boom. Thereby, the base part may be configured to be fixedly mounted to the telescopic boom by a threaded joint.

In a preferred development, the wear pad may further comprise at least one top layer part fastening means, preferably wherein the top layer part fastening means comprises a dowel pin. Thereby, the top layer part may be configured to be releasably mounted to the base part. In particular, the top layer fastening means may comprise two dowel pins which may partly extend into the base part and partly extend into the top layer part. Thereby, releasing and mounting the top layer part from and to the base part may be achieved by readily available tools. To this end, maintenance of the wear pad may be possible even under difficult circumstances. By providing two dowel pins, the erosion depth of the top layer part may be reduced further.

In a preferred development, the top layer part may have a thickness of 10 mm and may further be configured such that it is to be replaced after a wear greater or equal than 3-5 mm, wherein the dowel pins may each have a diameter of 2 mm and a length of 8 mm. Thereby, a gap of 6 mm between the sliding surface 16 and the dowel pins may be provided as erosion thickness.

According to a further development, the two dowel pins may for example be provided along a longitudinal middle axis of the wear resistant, low friction slide surface. Thereby, forces acting on the wear-resistant, low friction sliding surface may be dissipated into the base part partly by the dowel pins equally.

In a further development, the top layer part may have a thickness of 10 mm may further be configured such that it is to be replaced after a wear greater or equal than 3-5 mm. Thereby, it can be avoided that the wear reaches an extent which may be detrimental to a spatial boom segment orientation.

According to a further development, the top layer part may have a thickness of 10 mm may further be configured such that it is to be replaced after a wear greater or equal than 3-5 mm, wherein the dowel pins may each have a diameter of 2 mm and a length of 8 mm. Thereby, a gap of 6 mm between the sliding surface and the dowel pin may be provided as erosion thickness.

According to an attractive embodiment, the top layer fastening means may for example comprise a protrusion of the top layer part, protruding into a recess provided in the base part. Thereby, the erosion depth of the top layer part extends over the entire thickness of the top layer part.

A telescopic boom assembly for a work machine may be provided, comprising a first boom segment having at least one first wear pad assembly mounted to a free end of the first boom segment, and a second boom segment having at least one second wear pad assembly mounted to a sliding end of the second boom segment, wherein at least one of the wear pad assemblies comprises a wear pad having a base part and a top layer part configured to provide a wear-resistant, low friction sliding surface. The top layer part is configured to be releasably mounted to the base part. The second boom segment may be configured to be slidable along the at least one first wear pad assembly of the first boom segment.

According to the present disclosure, the term wear pad assembly may comprise a multitude of wear pads at a given cross-section in an x-y plane of a telescopic boom segment.

Seen from the perspective of the telescopic boom, the telescopic boom may comprise the first boom segment is a static part in the second boom segment is a slidable part. The telescopic boom may be configured such that the second boom segment may extend beyond the first boom segment. The second boom segment may be slidable until the second wear pad assembly abuts the first wear pad assembly. By comprising a wear pad having a base part and a top layer part configured to provide a wear resistant, low friction sliding surface, wherein the top layer part is configured to be releasably mounted to the base part, a simple, cost-effective, wear resistant telescopic boom of a work machine allowing only limited spatial boom segment offsets may be provided.

By this, the available erosion thickness, or margin for erosion of the wear pad, may be restricted to the available thickness of the top layer part or a part of the top layer part. At the same time, the remaining thickness of the wear pad may be configured such that it is optimized to support the top layer part and fixedly mounted the base part to the telescopic boom. Thereby, a more rigid, reliable and safe positioning of the second telescopic boom segment may be provided.

By providing the top layer part such that it is configured to be releasably mounted to the base part, various top layer part geometries may be utilized. In other words, the top layer part geometries not limited to the geometry of the base part. In general, any top layer part geometry may be utilized which is configured to be releasably mounted to the base part. Thereby, a greater flexibility and interchangeability of top layer parts may be attained.

Providing a top layer part such that it is configured to be releasably mounted to the base part, the top layer part may be replaced without replacing the entire wear pad. Thereby, the wear pad offers an increased life, reduced friction, reduced maintenance and reduced waste.

In a further development, at least one first wear pad assembly may be mounted to the inside of the first boom segment and wherein the at least one second wear pad assembly may be mounted to the outside of the second boom segment, such that the second boom segment may be slidably received on the inside of the first boom segment. Thereby, the first boom segment may be provided as the static boom segment relative to the second boom segment.

In a further development, at least one first wear pad assembly may be mounted on the outside of the first boom segment and wherein the at least one second wear pad assembly may be mounted on the inside of the second boom segment. Such that the second boom segment may be slidably received on the outside of the first boom segment. Thereby, the second boom segment may be provided as is the static boom segment relative to the first boom segment.

According to a further development, the telescopic boom assembly may comprise boom segments having a rectangular cross-section, wherein the wear pad assemblies may comprise at least one wear pad on each side of the corresponding boom segment. Thereby, positioning and guiding of boom segments may be provided such that both vertical and lateral forces acting on a boom segment may be consumed by wear pads according to the present disclosure.

According to a further development, the wear pad assemblies may comprise at least two wear pads on each side of the corresponding boom segment, wherein the wear pads provided on the shorter sides may comprise a base part larger than a base part of the wear pads provided on the larger sides of the rectangular cross-section. Thereby, the magnitude of vertical and lateral forces may be taken into account by different wear pad dimensions. The shorter sides may for example constitute the sides on which vertical forces are transported between two boom segments. The larger sides may for example constitute the sides on which lateral forces are transported between two boom segments.

A work machine may be provided comprising a telescopic boom assembly according to the present disclosure. The work machine may for example be a telehandler or a backhoe loader.

The present disclosure proposes a wear pad, a telescopic boom assembly and a work machine. The telescopic boom assembly and work machine comprise a wear pad according to the present disclosure. Wear pads according to the present disclosure allows servicing the wear pad assembly without removing the base part from a telescopic boom segment. The wear pad according to the present disclosure offers an increased life, reduced friction, reduced maintenance and reduced waste. Further, the teaching of the present disclosure provides a simple, cost-effective, wear resistant wear pad for a telescopic boom of a work machine having only limited spatial boom segment offset and an improved maintenance handling.

INDUSTRIAL APPLICABILITY

With reference to the Figures, a wear pad for a telescopic boom of a work machine and a telescopic boom of a work machine are applicable in any suitable work machine, for example a telehandler for pick and place tasks or for backhoe loader.

In practice, a wear pad for a telescopic boom of a work machine and a telescopic boom of a work machine and/or any combination of these various assemblies and components may be manufactured, bought, or sold to retrofit a telescopic boom, a work machine, or a machine already deployed in the field in an aftermarket context, or alternatively may be manufactured, bought, sold or otherwise obtained in an OEM (original equipment manufacturer) context.

As alluded to previously herein, the aforementioned embodiments may increase the reliability and performance as will be elaborated further herein momentarily.

Referring to FIG. 1, there is an embodiment shown disclosing a wear pad for a telescopic boom of a work machine comprising a base part configured to be fixedly mounted to the telescopic boom, and a top layer part configured to provide a wear-resistant, low friction sliding surface, wherein the top layer part is configured to be releasably mounted to the base part. The top layer part further comprises tapered edges and may further comprise a multitude of plugs. One skilled in the art will expect that various embodiments of the present disclosure will have an improved simplicity, necessitating less maintenance and less complex top layer parts for wear pads.

The same advantages apply to the FIGS. 3-6, in particular to the telescopic boom assemblies comprising two (FIGS. 3 and 4) or three (FIGS. 5 and 6) boom segments, and to FIG. 7, showing the work machine in the embodiment of a telehandler.

The present description is for illustrative purposes only and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," "include", "includes", "including", or the like are intended to be open-ended terms. Further, the phrase "based on" is intended to mean "based, at least in part, on" unless explicitly stated otherwise. Further, coordinate axes are intended to be exemplary only without delimiting the scope of the disclosure.

All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of values or dimensions herein are merely intended to serve as a shorthand method of referring individually to each separate value falling within the range, unless otherwise indicated herein, and each separate value is incorporated into the specification as if it were individually recited herein.

Furthermore, variations or modifications to certain aspects or features of various embodiments may be made to create further embodiments and features and aspects of various embodiments may be added to or substituted for other features or aspects of other embodiments in order to provide still further embodiments.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A wear pad for a telescopic boom of a work machine, the wear pad comprising:
   a base part configured to be fixedly mounted to the telescopic boom;
   a top layer part configured to provide a wear-resistant, low friction sliding surface, the top layer part configured to be releasably mounted to the base part; and
   the base part and top layer part including an unthreaded protrusion and a recess configured to slidably connect the top layer part and the base part with movement of the top layer part toward the base part.

2. The wear pad according to claim 1, wherein the sliding surface is equal to a surface area confined by an outer perimeter of the top layer part.

3. The wear pad according to claim 1, wherein the top layer part is configured such that edges extending perpendicular to a sliding direction are tapered.

4. The wear pad according to claim 3, wherein the top layer part comprises a nylon polymer, polytetrafluoroethylene, graphite, molybdenum disulfide a metal and/or a combination of a nylon polymer embedded with a lubricant.

5. The wear pad according to claim 1, wherein the top layer part comprises a top layer plate and a multitude of plugs extending at least partially into the top layer plate.

6. The wear pad according to claim 5, wherein the top layer plate comprises bronze, and wherein the multitude of plugs comprises graphite.

7. The wear pad according to claim 1, wherein the base part comprises a steel or a steel alloy.

8. The wear pad according to claim 1, wherein the base part comprises at least one threaded recess and at least one fastening screw configured to engage the at least one threaded recess to fasten the base part to a telescopic boom.

9. The wear pad according to claim 1, wherein the unthreaded protrusion comprises a dowel pin.

10. A telescopic boom assembly for a work machine, comprising
    a first boom segment having at least one first wear pad assembly mounted to a free end of the first boom segment, and
    a second boom segment having at least one second wear pad assembly mounted to a sliding end of the second boom segment,
    wherein at least one of the wear pad assemblies comprise a wear pad having a base part and a top layer part configured to provide a wear-resistant, low friction sliding surface,
    the top layer part is configured to be releasably mounted to the base part; and
    the base part and the top layer part including an unthreaded protrusion and a recess configured to slidably connect the top layer part and the base part with movement of the top layer part toward the base part.

11. The telescopic boom assembly according to claim 10, wherein the at least one first wear pad assembly is mounted to an inside of the first boom segment and wherein the at least one second wear pad assembly is mounted to an outside of the second boom segment, such that the second boom segment is slidably received on the inside of the first boom segment.

12. The telescopic boom assembly according to claim 10, wherein the at least one first wear pad assembly is mounted on an outside of the first boom segment and wherein the at least one second wear pad assembly is mounted on an inside of the second boom segment, such that the second boom segment is slidably received on the outside of the first boom segment.

13. The telescopic boom assembly according to claim 10, wherein the second boom segment comprises at least one third wear pad assembly mounted to a free end of the second boom segment, further comprising
    a third boom segment having at least one fourth wear pad assembly mounted to a sliding end of the third boom segment,
    wherein the third boom segment is configured to be slidable along the at least one third wear pad assembly of the second boom segment.

14. The telescopic boom assembly according to claim 10, wherein the boom segments have a rectangular cross-section and wherein the wear pad assemblies comprise at least one wear pad on each side of a corresponding boom segment.

15. The telescopic boom assembly according to claim 14, wherein the wear pad assemblies comprise at least two wear pads on each side of the corresponding boom segment, wherein the wear pads provided on shorter sides of the rectangular cross-section comprise a base part larger than a base part of the wear pads provided on larger sides of the rectangular cross-section.

16. A work machine comprising a telescopic boom assembly according to claim 10.

* * * * *